United States Patent

Froehlich et al.

[15] 3,706,851

[45] Dec. 19, 1972

[54] MEANS FOR EVALUATING AND DISPLAYING CERTAIN IMAGE PORTIONS OCCURING WITHIN A TOTAL IMAGE

[72] Inventors: Walter Froehlich, 73 Karlsruhe; Walter Lang, 708 Aalen, both of Germany

[73] Assignees: Carl Zeiss-Stiftung, Heidenheim on the Brenz, Wuerttembert; Siemens Aktiengesellschaft, Munich, Germany

[22] Filed: Jan. 15, 1971

[21] Appl. No.: 106,859

[30] Foreign Application Priority Data

Jan. 20, 1970 Germany....................P 20 02 260.0

[52] U.S. Cl.................178/6.8, 178/7.1, 178/DIG. 6, 178/DIG. 34, 328/150

[51] Int. Cl.............................H04n 5/22, H04n 1/38

[58] Field of Search........178/6, 6.8, 7.1, 7.2, DIG. 6, 178/DIG. 34; 328/111, 112, 115, 116, 117, 150

[56] References Cited

UNITED STATES PATENTS

| | | | |
|---|---|---|---|
| 3,591,713 | 7/1971 | Olsson et al. | 178/DIG. 34 |
| 3,333,055 | 7/1967 | Krause | 178/7.1 |
| 2,992,293 | 7/1961 | Cameron et al. | 178/6.8 |
| 3,214,515 | 10/1965 | Eberline | 178/6.8 |
| 3,296,368 | 1/1967 | Lohmann | 178/6.8 |
| 3,413,412 | 11/1968 | Townsend | 328/112 |

*Primary Examiner*—Robert L. Griffin
*Assistant Examiner*—Joseph A. Orsino, Jr.
*Attorney*—Sandoe, Hopgood and Calimafde

[57] ABSTRACT

For TV monitor display of image portions of certain brightness or of certain dimensions as they may occur within a total image taken by a television camera, the invention contemplates feeding the video signal to an adjustable amplitude discriminator. The output signal of the amplitude discriminator is operative upon the video signals in such manner as to blank out or suppress that portion of the total image which is outside the determined image portions. The resulting signal is fed to the monitor. The monitor screen displays a total field, within which the determined image portions appear in correct gray value shading, while the rest of the image field appears in a constant gray value.

13 Claims, 11 Drawing Figures

MEANS FOR EVALUATING AND DISPLAYING CERTAIN IMAGE PORTIONS OCCURING WITHIN A TOTAL IMAGE

The invention relates to means for evaluating certain image portions of a total image, as scanned by a television camera, and for displaying the evaluated image portion on the screen of a television monitor. Such arrangements are particularly useful in carrying out stereometric analyses, to control adjustment and measurement by displaying the image portions evaluated during each measurement on the monitor.

In monitor displays of the character indicated, it is known that a modified image may be superposed on the original unchanged image to identify the evaluated image portions. This modified image exhibits with uniform brightness only those areas which are evaluated under predetermined conditions. To this end, the original unchanged image and the modified image may be displayed alternately in rapid succession (as successively alternating rasters) on the monitor, or the signals for the two images may be superposed electronically and displayed jointly. Disadvantageously, in such a reproduction, the modified image must be very bright to permit a clear distinction from other bright image portions which are not determined during the measurement. Another disadvantage is that the superposed image may be displaced or offset, in the scanning direction, with respect to the original image. These disadvantages may have the result that details of interest in the image are effectively masked or hidden. This renders it more difficult, if not impossible in some cases, to coordinate the adjustment of the measuring parameters in the course of attempting a superposition of the modified image.

It is also known that the modified image and the unchanged image may be reproduced alternately at such a low frequency (in order to avoid the indicated disadvantage) that an observer can perceive the two images separately, so that he can then determine where the modified image (and the image portions evaluated therewith) are located within the total image.

The object of the present invention is to provide an arrangement of the above-described type which permits the display and evaluation of image portions selected according to their brightness. Another object is to provide an arrangement with which image portions can be selected, represented and evaluated on the basis of their dimensions. And a further object is to provide such an arrangement characterized by unambiguous identification of the image portions which are determined by the measurement.

The achievement of these objects is realized by using a discriminator to localize the image portions to be evaluated on the basis of their gray value, and by displaying on the monitor only those image portions to whose gray value the discriminator has been set. To this end, the invention consists in that the video signals corresponding to the portions of the total image outside the determined image portions are blanked out by an amplitude discriminator to which the output video signal of the television camera is fed, and that only the evaluated image portions are reproduced on the image screen.

The portion of the total image outside the determined image portions are therefore caused to appear with a constant gray value, preferably substantially black or substantially white; while the determined image portions themselves appear unmodified, either with their correct gray value or with a constant but different gray value.

One embodiment of the invention employs an electronic reversing switch which is actuated by the amplitude discriminator. In one state of this reversing switch the monitor has an inertia-free connection to the pure (unmodified) video signal, for use in creating its display of the determined image portion; in the other state of the switch, the connection is to a constant voltage.

In a second embodiment, the original video signal is not fed to the monitor, but this monitor is merely controlled by the amplitude discriminator with the black, white, or any other gray value selected. This possibility is particularly useful when the amplitude discriminator is set to a narrow amplitude range. In such case, as a practical matter, only contrast-free spots will appear in the display of the original image, unless special measures are taken.

Other objects and various further features of novelty and invention will be pointed out or will occur to those skilled in the art from a reading of the following specification in conjunction with the accompanying drawings. In said drawings:

FIG. 1 is a schematic diagram of a circuit of the invention, FIG. 1A being a modified fragment thereof;

FIGS. 2*a* to 2*f* comprise a set of related diagrams and curves, on the same sweep base, to illustrate operation of the circuit of FIG. 1;

Figures 1, 1A:
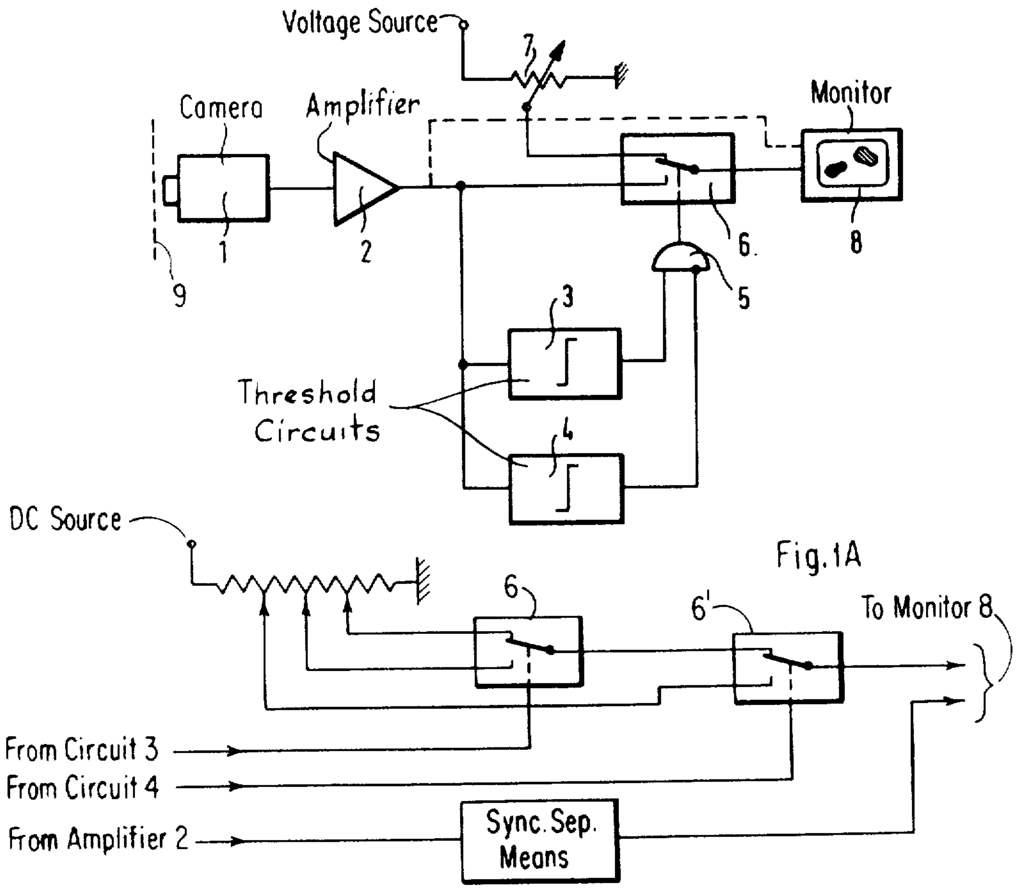

In the arrangement of FIG. 1, a camera 1 generates an output video signal which, complete with its blanking and synchronizing pulses, is amplified in an amplifier 2 and fed to a reversing switch 6 (preferably an electronic switch) as well as to an amplitude discriminator; the latter consists of threshold circuits 3 and 4, as well as a gate 5 connected to the outputs of the circuits 3, 4, and the state of gate 5 determines the actuated condition of switch 6. Switch 6 connects a display monitor 8 to the amplifier 2 when the amplitude of the output signal of amplifier 2 is between limiting values established by circuits 3 and 4. At all other times, a constant voltage, which is shown tapped from a voltage-dividing potentiometer 7, is fed to monitor 8; the voltage tapped at 7 may be equal to the black value, to the white value or to an intermediate value. The dashed line connection between the output of amplifier 2 and the input of monitor 8 will be understood to suggest appropriate line and frame synchronizing means, including, for example, a sync-separator circuit operative to segregate the synchronizing pulses from the video output signal. Accordingly, for the potentiometer-connecting intervals of switch 6, the image of the monitor 8 is black, white or gray, as the case may be, depending upon the tap adjustment at 7.

Figure 2:
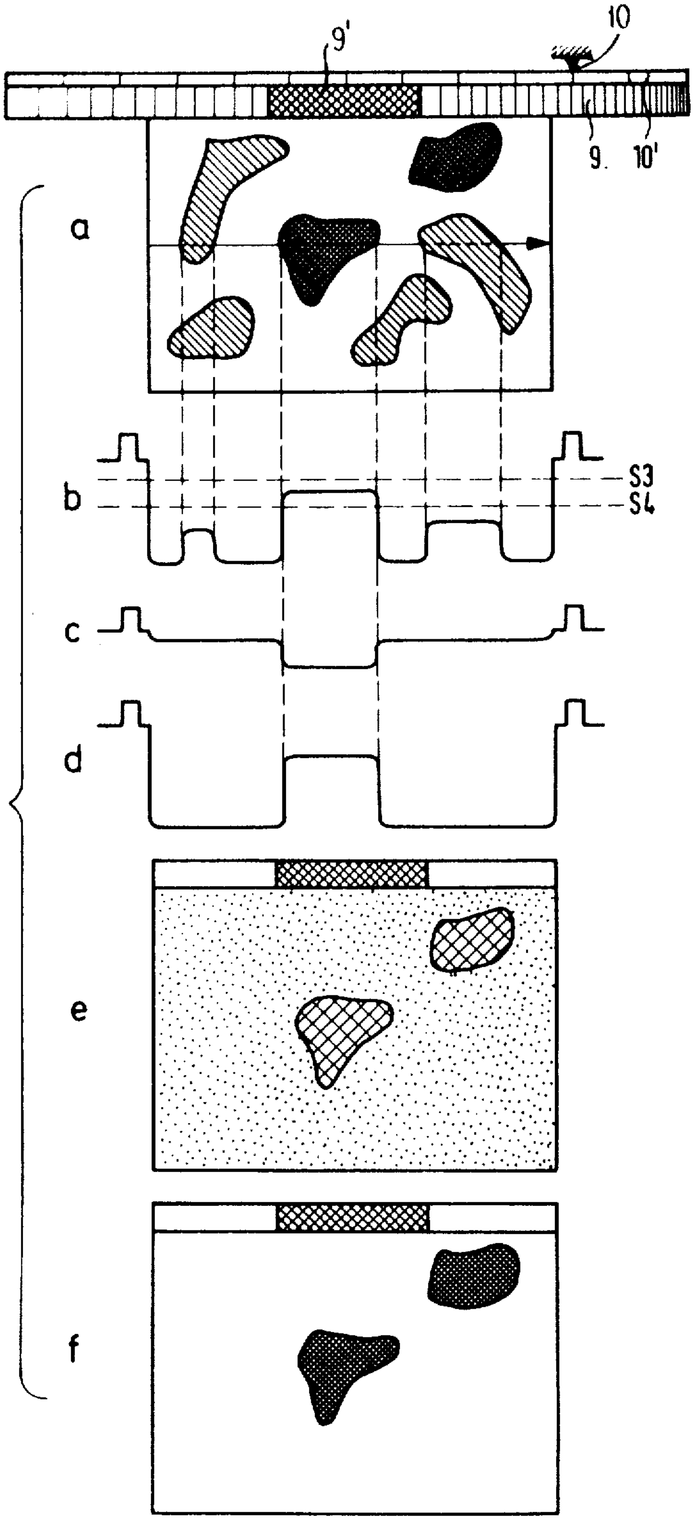

The operation of the arrangement according to FIG. 1 will be described more fully in connection with the various diagrams of FIG. 2. FIG. 2*a* shows the total picture field taken by the camera 1. Within this field (according to FIG. 2*a*) six different objects appear. The four objects with a simple hatching indicate a medium gray tone, and the other two with the crossed hatching indicate a darker gray tone than that of the said four objects. The surrounding field is assumed bright. The horizontal arrow indicates the position of a typical one of scanning lines of the television camera. Disregarding noise, the video signal of this television scan line has a time-profile of voltage, as indicated in FIG. 2*b*, and the line-synchronizing pulse appears at the beginning of the line. Since the surrounding field is very bright, the level of the video signal after the blanking signal is in the "white" value range. If the first object is scanned with the medium gray tone, the signal value rises slightly and, scanning the second or darker object (with crossed hatching), the signal level rises further. If one is interested in a stereometric analysis, as for example, involving interest only in the darker objects (crossed hatching), the threshold values of the circuits 3 and 4 are so adjusted that only those video-signal voltage levels are selected which lie between the two threshold values corresponding to the image portions of interest, i.e., in the selected example, in the range corresponding to the dark-object level. In FIG. 2*b* the position of these two threshold values is indicated by the broken lines ($S_3$, $S_4$) which extend parallel to the black and white voltage-amplitude values of the video signal.

These threshold values can be set in known manner, for example, with biased diodes. Preferably, so-called Schmitt triggers are used for the circuits of threshold stages 3, 4. Such a circuit produces an output-signal voltage as long as the input voltage exceeds a certain threshold value. In order to change the threshold value, the reference d-c input voltage can be supplied over an adjustable voltage divider. If two threshold values are to be effective, as in the embodiment shown, two such Schmitt triggers are required, and they may receive the same input voltage either over a voltage divider or directly. If the circuits are reaction-free in operation, no separator stages are required. The two threshold values can then be set differently, independent of each other. The circuit can also be so laid out that the signal voltage appears as two outputs, in phase opposition. In some cases, it suffices to evaluate only those image portions which are above or below a certain threshold value. In that event, only one threshold stage need be used, or the threshold value of one of the circuits 3, 4 can be set to the black or white value, while the threshold value of the other of these circuits is set to the desired value. In the arrangement according to FIG. 1, neither of the threshold stages responds to dark objects; that being the case, a " 0" signal appears at the input of gate 5, and switch 6 is in the position shown. With increasing brightness of the scanned objects, threshold circuit 3 is the first to respond, so that a "1" signal appears at its output, and likewise at the output of gate 5; and switch 6 is reversed. If the amplitude of the video signal of the bright objects also exceeds the threshold value of circuit 4, a "1" signal appears at both inputs of gate 5, causing it to produce a "0" signal, and the switch is brought again into the position shown.

For the interval during which switch 6 connects the video signal of amplifier 2 through to monitor 8, the television image taken by camera 1 is reproduced in its correct gray-tone values for voltage-amplitude levels in the range $S_3$–$S_4$ (FIG. 2*a*); and depending on the selected position of potentiometer 7, the surrounding field of the image portions reproduced in a correct gray tone, is scanned as black, white or bright. FIG. 2*c* shows the output signal of switch 6 for the case in which potentiometer 7 is set so that the surrounding field is scanned black; in that event, the screen of monitor 8 creates an image display, substantially as shown in FIG. 2*e*. If potentiometer 7 is set so that the surrounding field is scanned white, then the output signal of switch 6 has the profile represented in FIG. 2*d*, and an image display, substantially as shown in FIG. 2*f*, appears on the screen.

As mentioned above, each of the threshold circuits 3, 4 is a so-called Schmitt trigger whose threshold value can be changed either by supplying the input voltage via a voltage divider the base of which is connected to a d-c voltage, or by providing a varying reference voltage. The latter application is illustrated in the embodiment of FIG. 3.

Figure 3:
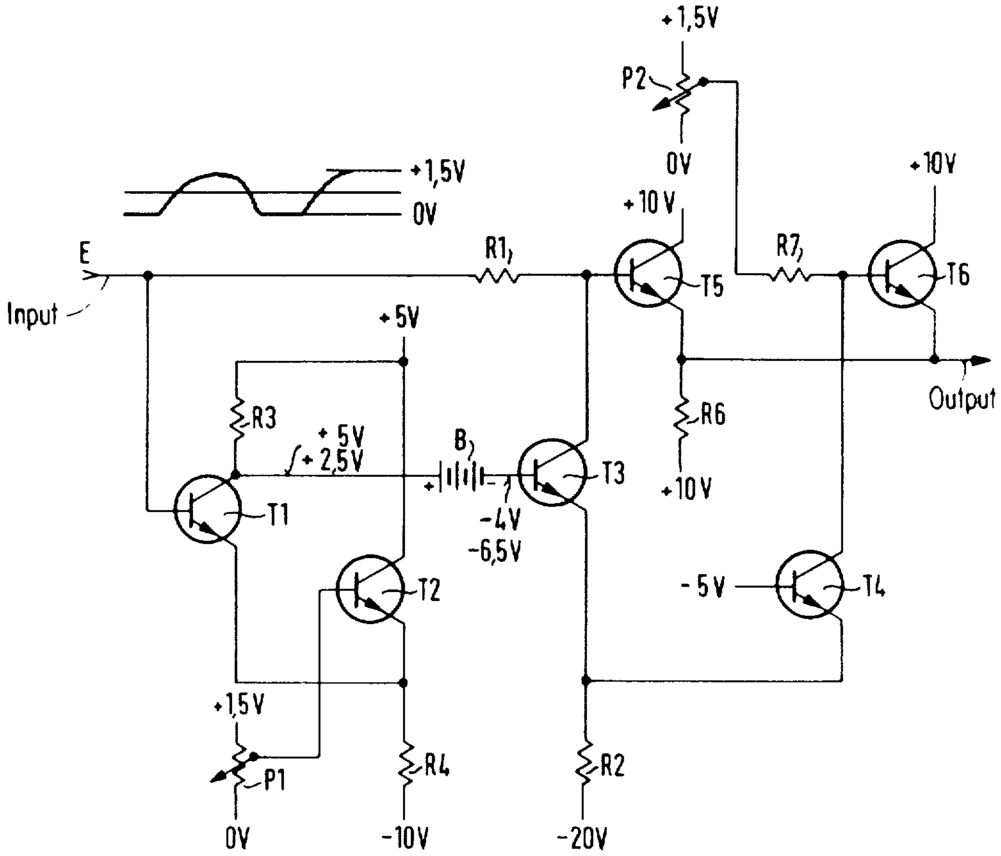
FIG. 3 is a circuit diagram to show details of the arrangement of FIG. 1.

In FIG. 3, the video signal is fed to the input E. From there it is applied, in one line, over a series resistance $R_1$ to the base of a switch transistor $T_5$ and, in another line, to the base of a transistor $T_1$; the latter transistor $T_1$, together with a transistor $T_2$, a common emitter resistance $R_4$, and a collector resistance $R_3$, forms a Schmitt trigger. If the voltage of the video signal is lower than the d-c reference voltage set on potentiometer $P_1$, transistor $T_1$ is blocked, and its collector has a voltage of about +5 volts, which is fed over a battery B of about 9 volts, to the base of transistor $T_3$, thus determining a base voltage of −4.5 volts at $T_3$. Since transistor $T_3$ is coupled over an emitter resistance $R_2$ to a transistor $T_4$ whose base has a voltage of −5 volts, it is so connected as to block passage of the video signal via transistor $T_5$. Transistor $T_4$ is so connected as to release a transistor $T_6$, which is adjusted to operate in accordance with a selected d-c voltage, set at potentiometer $P_2$; the voltage set at potentiometer $P_2$ is adjustably variable between 0 and 1.5 volts, corresponding to the selected black or white value of the video signal. Thus, as long as the video-signal amplitude is smaller than the threshold value set at potentiometer $P_1$, the image appears in a uniform gray, in accordance with the setting at potentiometer $P_2$. But if the video-signal amplitude exceeds this threshold value, transistor $T_1$ becomes conductive, transistor $T_3$ is blocked, and transistor $T_5$ is released for the video signal. Since simultaneously transistor $T_4$ becomes conductive and transistor $T_6$ blocked, the video signal is connected to the output, and the thus-selected portion of the total image appears on the screen with its correct gray value.

If two threshold values are to be effective in the embodiment represented in FIG. 1, an additional Schmitt trigger is required, which, is built up in the same manner as said described Schmitt trigger (FIG. 3). The inputs of the two Schmitt triggers are then connected in parallel, while their outputs are coupled to a gate, such as the gate 5 of FIG. 1. The output of such gate is connected with the positive terminal of a battery, so that gate action may determine the state of electronic-switch action, already described for the remaining circuitry of FIG. 3.

The amplitude discriminator thus sorts out objects according to their brightness. It is theoretically possible to calibrate the amplitude discriminator so as to select and display particular objects, right from the beginning, i.e., without further control manipulation; but this is only possible if the equipment has constant sensitivity. But constant sensitivity is difficult to achieve, since the intensity of illumination, the sensitivity of the camera, and numerous other factors vary. It is therefore preferred to arrange a neutral wedge or a corresponding gray filter (suggested at 9 in FIG. 1) in the response field of camera 1.

Such a wedge or filter may be arranged adjustably. In this case said filter is so adjusted with respect to the scan field of the camera that the gray values which correspond to the adjustment of the discriminator appear on the image screen of the monitor. If there is only said neutral wedge within the scan field of the camera, the monitor 8 will present a display field showing a vertical band of different gray values which correspond to that portion 9' of said wedge within which the brightness of the light falling through the wedge is within the region ($S_3$, $S_4$) selected by the discriminator. If the wedge filter is adjusted so that said vertical band appears at a preselected position of the image screen, e.g., in the middle of the screen, it is possible to read the instantaneous position of the filter 9 and thus its displayed gray values by an index mark 10. The width of the displayed part of the neutral wedge corresponds to the distance of the threshold values at circuits 3 and 4, representing the width or extent of the video-amplitude pass range or "window" of the discriminator. When the scan field of the television camera is so large that the whole wedge lies within it, the neutral wedge need not be arranged adjustably. In this case it is possible to see directly on the image screen of the monitor the region of displayed gray-values and the width of said discriminator-"window."

Still further alternatively, it will be understood that such a neutral wedge may be electronically, as distinguished from optically, operative upon the system, as by reference of preselected threshold values to a "step wedge" of calibrated reference voltage.

Figure 4:
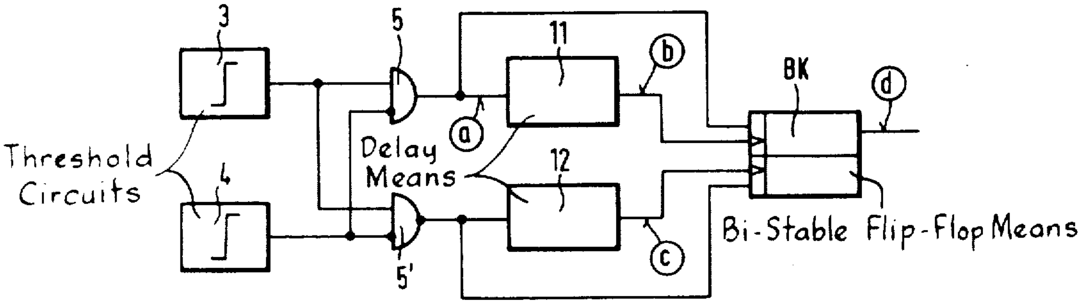
FIG. 4 is a schematic diagram to illustrate an arrangement for selecting image portions of a certain size.

With the apparatus described above, objects in the camera field may be selected merely according to their brightness. But frequently their size and distribution must also be taken into consideration in the evaluation. In this event, the system of FIG. 4 may be used. In FIG. 4, reference numbers 3 and 4 again denote the two threshold circuits to which the camera video-output signal is fed. Gates 5 and 5' are connected to these two threshold stages, to generate phase-opposed signals and to actuate two delay devices 11 and 12; one (11) of the delay devices delays the front edge of the output pulse of the discriminator stage, and the other (12) delay device is similarly operative upon the trailing or rear edge of the same pulse. The two delay devices 11, 12 will be understood to actuate a switch for the output signal of the amplitude discriminator. In FIG. 4, the switch is a bi-stable flip-flop circuit BK, which is conditioned in its respective states by the output signals of the amplitude discriminator, and whose dynamic inputs are connected to the respective delay devices 11 and 12. Preferably, the delay time of the delay devices is adjustably variable. The delay devices may each consist of a monostable multivibrator, the output pulses of which are differentiated. Of the two pulses formed by the differentiation of each output pulse, the first is suppressed, while the second is used to actuate dynamic inputs of the flip-flop circuit BK. With such a circuit arrangement, it is possible to select, for display and evaluation, objects of minimum size in the line-scanning direction. It is also possible to use this circuit for counting particle concentrations.

Figure 5:
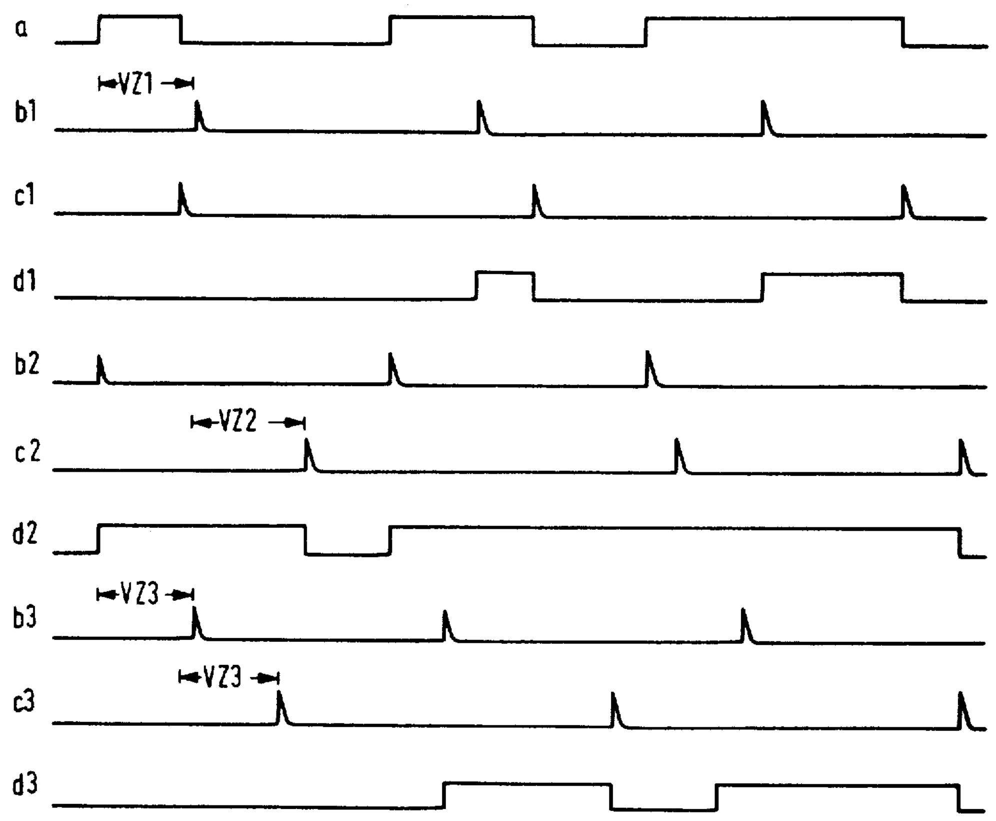
FIG. 5 is a series of 10 pulse diagrams on the same time scale, to illustrate operation of the circuit of FIG. 4.

Three different operating states will now be described in connection with the pulse diagrams of FIG. 5. The pulse diagrams of FIG. 5 are labelled with lower-case letters which correspond with use of the same letters to identify tap points in the arrangement of FIG. 4, being designated therein by encircled lower-case letters. Thus, curve *a* in FIG. 5 denotes a pulse sequence of the amplitude discriminator. In a first operating state, we assume that merely the front or leading edge of each pulse of curve *a* is delayed, while the rear or trailing edge is not delayed. The applicable delay time is designated $VZ_1$ and is so entered in the context of the first pulse of curve $b_1$, and this delay is greater than the length of the first pulse of curve *a*; in other words, since the rear edge is not delayed, the first output pulse of delay device 11 arrives at the flip-flop circuit BK only when the first conditioning pulse of curve *a* has already passed. The flip-flop circuit BK therefore cannot be reversed. The first pulse of curve *a* is thus effectively suppressed. The situation is different, however, with the second and third pulses whose lengths (or durations) are both greater than the delay time $VZ_1$; in such event, the flip-flop circuit BK has already been conditioned when the delayed pulse arrives, causing a flip-flop reversal at BK. When the undelayed output pulse of device 12 arrives (curve $c_1$), circuit BK is switched back again, and curve $d_1$ shows the resulting output pulses, developed by the flip-flop circuit BK. Thus, in this first illustrative operating state, pulses of duration less than the delay time are suppressed, while other pulses are reproduced with differing magnitudes, as shown by curve $d_1$.

In a second operating state, the front or leading edge of the output signal of the discriminator is not delayed, but the rear or trailing edge is delayed, to the extent of delay $VZ_2$, so indicated in curve $c_2$. The flip-flop circuit BK is reversed at the occurrence of the front edge of the first pulse of curve *a*, as shown in curve $d_2$. After the end of this first pulse (curve *a*) and after the delay time $VZ_2$, the flip-flop circuit BK is reset again. At the start of the second pulse (curve *a*), it is reversed again; but it is not reset by this second pulse, since the delay $VZ_2$ is greater than the interval between the second and third pulses of curve *a*. The net result of having selected this second operating state is that many small image areas or particles which are close together are thus displayed as one or more larger image areas or particles; we speak in this case of agglomeration counting. In this case (curve $d_2$), as with the first operating state (curve $d_1$), the displayed area does not correspond to the actually evaluated area.

But if both edges of the output pulse of the discriminator are delayed by the same amount $VZ_3$, as represented in curves $b_3$ and $c_3$, small image areas or particules are suppressed, and the larger particles are reproduced with their actual area as long as the delay interval is small with respect to the scanned edges (e.g., left and right edges, respectively) of the particular image area limits, for each scan line involved.

The flip-flop circuit BK can actuate the monitor 8 directly, but it may also be used to actuate the switch 6 over which the video signal is conducted for the display of the selected image portion in the correct gray tone value. Also, it will be understood that the flip-flop circuit BK may be replaced by other known switches which have a similar function.

It will be seen that the described embodiments meet the stated objects and that modifications may be made within the scope of the invention. For example, if the switch 6 is one of two (6, 6') connected for operation by achievement of threshold at the respective circuits 3, 4, where one contact of switch 6' is in series with the output of switch 6, then essentially a first gray value may be displayed for scanned brightness levels occurring between the thresholds of circuits 3, 4, while a second gray value may be displayed for scanned brightness levels exceeding both thresholds; when neither of the thresholds is achieved at 3 or 4, a third or background gray value voltage is relayed by switch 6 to the TV monitor. In FIG. 1A, this is done by supplying to the respective input contacts of switch 6, first and second tapped voltages from potentiometer 7, and by supplying to the normally open input contact of switch 6', a third tapped voltage from potentiometer 7. A sync-separator circuit (which may be part of monitor 8) is shown for rejecting video signal from the output of amplifier 2, in order to afford correct synchronization of raster-generating voltages for the display at 8. In this circumstance, the four single-hatched image portions of FIG. 2*a* may be the result of threshold achievement at 3 but not at 4, whereas the two crossed-hatch image portions of FIG. 2*a* may be the result of threshold achievement at both 3 and 4.

What is claimed is:

1. Apparatus for evaluating certain image portions of the total image scanned by a television camera and for displaying the evaluated image portions on the face of a television monitor, comprising an amplitude discriminator having an input for accepting the video-signal output of the television camera, and output control-circuit means connected to said input and having an output for connection to the video-signal input of a television monitor, said discriminator including amplitude-responsive means operative upon achievement of a particular video-signal amplitude and producing an electrical output upon detection of such achievement, said output control-circuit means having two states and having a state-control input connected to the output of said amplitude discriminator, whereby said discriminator may determine one to the exclusion of the other of said states and thus select for transmission to the monitor only a signal corresponding to an amplitude-selected fraction of the scanned video output of the camera, and said output control-circuit means including means supplying a continuous voltage-level output during periods in which said output control-circuit means is in the other of said states.

2. Apparatus according to claim 1, in which said discriminator includes first and second amplitude-responsive devices set to produce their respective electrical outputs upon achievement of first and second video-signal levels, said circuit means being connected to suppress video-signal levels below the lower of said levels and above the greater of said levels.

3. Apparatus according to claim 1, and including a television camera having a video-output connection to said discriminator, and neutral-wedge filter means including means for adjustably positioning the same with respect to the optical field of view of said camera.

4. Apparatus according to claim 1, and including a television camera having a video-output connection to said discriminator, and a neutral-wedge filter positioned in the field of camera scan along one edge thereof, the successive step wedges of said filter being aligned in the line-scan direction; whereby the monitor display of said image portions will include an image portion which indicates, by its position in the scan-line direction, the actual optical intensity of scanned subject matter passed by said discriminator.

5. Apparatus according to claim 4, in which said amplitude-responsive means includes first and second amplitude-responsive threshold devices set to produce their respective electrical outputs upon achievement of first and second video-signal threshold levels, said circuit means being connected to suppress video-signal levels below the lower of said levels and above the greater of said levels, whereby the scan-line length of the displayed image portion corresponding to scan of said wedge filter is an indication of the range of levels passed by discriminator action.

6. Apparatus for evaluating certain image portions of the total image scanned by a television camera and for displaying the evaluated image portions on the face of a television monitor, comprising an amplitude discriminator having an input for accepting the video-signal output of the television camera, electronic-switch means having two input connections and an output for connection to the video-signal input of a television monitor, one of said two input connections being connected to the video-signal input of said discriminator, a continuous voltage connection to the other of said two input connections, said discriminator including amplitude-responsive means operative upon achievement of a particular video-signal amplitude and producing an electrical output upon detection of such achievement, said electronic-switch means including a state-control input connected to the output of said amplitude discriminator, said switch means connecting camera video-output signal to said monitor, in alternation with said continuous voltage, in accordance with the control output of said amplitude-responsive means; whereby said discriminator may select for transmission to the monitor only a signal corresponding to an amplitude-selected fraction of the scanned video output of the camera.

7. Apparatus according to claim 6, in which said continuous voltage connection comprises means for selectively adjusting the voltage level thereof in a range of levels spanning black and white display values at the monitor, the continuous voltage being d-c.

8. Apparatus according to claim 6, in which said continuous voltage connection comprises means for selectively adjusting the voltage level thereof in a range of levels spanning black and white display values at the monitor, the voltage being a-c at a frequency substantially exceeding the line-scanning frequency of the video signal.

9. Apparatus according to claim 6, said discriminator producing a signal output at each detected onset of said particular video-signal amplitude and at termination of at least said particular video-signal amplitude, said discriminator including delay means operative upon said last-defined signal output, said circuit means including a control device establishing said control connection and responsive to delayed output of said delay means.

10. Apparatus according to claim 9, in which said delay means is selectively variable.

11. Apparatus according to claim 9, in which said delay means is operative upon one to the exclusion of the other of the signal outputs which respectively characterize said onset and said termination.

12. Apparatus according to claim 9, in which said control device includes bi-stable flip-flop circuit means.

13. Apparatus according to claim 6, in which said electronic-switch input connections are two of at least three input connections, means supplying a second continuous voltage to the third of said three input connections, said discriminator including first and second amplitude-responsive threshold devices set to produce their respective electrical outputs upon achievement of first and second video threshold levels, said devices being connected to suppress video-signal levels below the lower of said levels and above the greater of said levels; said devices and electronic-switch means being further connected to supply to the monitor (a) one of said continuous voltages for input video amplitudes less than the lower of said threshold levels, (b) video-signal amplitudes in the range between said threshold levels, and (c) the other of said continuous voltages for input video-signal amplitudes exceeding the greater of said threshold levels.

* * * * *